(12) United States Patent
Zhang et al.

(10) Patent No.: US 9,810,781 B2
(45) Date of Patent: Nov. 7, 2017

(54) DATA PROCESSING METHOD AND APPARATUS BASED ON AUTOMATIC IDENTIFICATION SYSTEM

(71) Applicant: Huawei Technologies Co., Ltd., Shenzhen, Guangdong (CN)

(72) Inventors: Di Zhang, Shenzhen (CN); Guochi Tan, Shenzhen (CN); Wei Peng, Shenzhen (CN); Yaoguang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 14/584,832

(22) Filed: Dec. 29, 2014

(65) Prior Publication Data

US 2015/0117304 A1    Apr. 30, 2015

Related U.S. Application Data

(63) Continuation of application No. PCT/CN2013/070485, filed on Jan. 15, 2013.

(30) Foreign Application Priority Data

Aug. 30, 2012    (CN) .......................... 2012 1 0315443

(51) Int. Cl.
  *G01S 13/93* (2006.01)
  *H04B 7/26* (2006.01)
  (Continued)

(52) U.S. Cl.
  CPC ............ *G01S 13/9307* (2013.01); *G08G 3/02* (2013.01); *H04B 7/2643* (2013.01); *H04J 3/1694* (2013.01); *H04W 74/0808* (2013.01)

(58) Field of Classification Search
  None
  See application file for complete search history.

(56) References Cited

U.S. PATENT DOCUMENTS 5,675,573 A * 10/1997 Karol ................. H04L 12/5602
                                                                      370/230
7,979,088 B2    7/2011 Miller
(Continued)

FOREIGN PATENT DOCUMENTS

CN            2784306 Y       5/2006
CN            1889716 A       1/2007
(Continued)

OTHER PUBLICATIONS

Torkild Eriksen, et al., "Maritime traffic monitoring using a space-based AIS receiver", Acta Astronautica, vol. 58, No. 10, May 1, 2006, p. 537-549.
(Continued)

*Primary Examiner* — Peter Chau

(57) ABSTRACT

The present invention discloses a data processing method and apparatus based on an automatic identification system, relates to the field of communications network technologies The method comprises: a virtual station container receives data request sent by a poller, and successively checks whether each virtual station in the virtual station container has to-be-sent data in a current timeslot, where the virtual station includes a virtual timeslot allocation logic TAL device; and when a first virtual station has to-be-sent data in the current timeslot, the virtual station container reads the data in the first virtual station, and sends the read data to a transmitter. The method provided by the embodiments of the present invention is applicable to data exchange between an automatic identification system and an external network.

9 Claims, 5 Drawing Sheets

---

A virtual station container receives data requests successively sent by a poller, and successively checks whether each virtual station in the virtual station container has to-be-sent data in a current timeslot ⟋— 101

When a first virtual station has to-be-sent data in the current timeslot, the virtual station container reads the data in the first virtual station, and sends the read data to a transmitter ⟋— 102

(51) Int. Cl.
  *H04J 3/16* (2006.01)
  *H04W 74/08* (2009.01)
  *G08G 3/02* (2006.01)

(56) References Cited

U.S. PATENT DOCUMENTS

| | | | | |
|---|---|---|---|---|
| 2003/0081624 | A1* | 5/2003 | Aggarwal | H04L 12/5601 370/412 |
| 2003/0103475 | A1* | 6/2003 | Heppe | H04B 7/2681 370/321 |
| 2007/0191051 | A1* | 8/2007 | Suonvieri | H04W 52/16 455/522 |
| 2009/0045909 | A1 | 2/2009 | Miller | |
| 2009/0105549 | A1* | 4/2009 | Smith | A61B 5/14551 600/300 |
| 2012/0026989 | A1* | 2/2012 | Barghi | H04L 1/0668 370/336 |

FOREIGN PATENT DOCUMENTS

| | | |
|---|---|---|
| CN | 101335679 A | 12/2008 |
| CN | 101344993 A | 1/2009 |
| CN | 101404653 A | 4/2009 |
| CN | 101441471 A | 5/2009 |
| CN | 201820362 U | 5/2011 |
| CN | 201887780 U | 6/2011 |
| CN | 102387186 A | 3/2012 |

OTHER PUBLICATIONS

"Technical characteristics for an automatic identification system using time-division multiple access in the VHF maritime mobile band", International Telecommunication Union Recommendation ITU-R M.1371-4, Apr. 2010, 144 pages.

Li Liping, "Study on Communication Performance of Automatic Identification System Based on TDMA", These Submitted to Tianjin University of Technology for the Master's Degree, Apr. 2011, 70 pages.

"Discussion on the Application of AIS'S Four Protocols", Navigation Technology, Apr. 2003, 4 pages.

Li, Dajun, et al., "Research and Realization of the AIS System Platform", www.autocontrol.cn, 2005, 3 pages.

Dajun Li, et al., "SOTDMA Application and Performance Analysis", Application of Electronic Technique, 2006, 5 pages.

Jia-chun Zheng, et al., "A Study of Realization of AIS Communication Protocols with DSP", Navigation of China, No. 1, Mar. 2005, 6 pages.

Yue-li Hu, et al., "AIS Protocol Frame Realization Based on Z85C30", Navigation of China, No. 1, Mar. 2007, 4 pages.

Wei Wucai, et al., "Virtual Aids-to-Navigation information system based on AIS", China Water Transport, vol. 4, No. 11, Nov. 2006, 2 pages.

"AIS and Virtual AIS Aids to Navigation", UKHO, 5 pages.

* cited by examiner

DATA PROCESSING METHOD AND APPARATUS BASED ON AUTOMATIC IDENTIFICATION SYSTEM

CROSS-REFERENCE TO RELATED APPLICATION

This application is a continuation of International Application No. PCT/CN2013/070485, filed on Jan. 15, 2013, which claims priority to Chinese Patent Application No. 201210315443.0, filed on Aug. 30, 2012, both of which are hereby incorporated by reference in their entireties.

TECHNICAL FIELD

The present invention relates to the field of communications network technologies, and in particular, to a data processing method and apparatus based on an automatic identification system.

BACKGROUND

To ensure safety and efficiency of maritime navigation, a shipborne automatic identification system (AIS) is adopted, so that navigating ships identify and position each other. The AIS forwards satellite positioning information (and a ship name, a voyage, cargo, and the like) in a broadcast manner between ships and between a ship and a shore by means of wireless communication. By using the AIS, ships during navigation may discover each other and avoid collision, and a shore management center may also trace a ship and release information to the ship.

The AIS serves as an industry private network, and a communications protocol thereof is designed according to service requirements. The AIS has features of self-organizing and being closed. An internal running condition of the AIS may be exported to the outside by using a base station, but external data cannot be injected to an AIS network easily. For example, during inland navigation, with the full coverage of a mobile cellular network, a General Packet Radio Service (GPRS) or a 3rd-generation (3G) mobile communications technology is selected as a radio bearer in some places. The mobile cellular network can read a condition of a station in the AIS network, but an AIS station cannot reversely obtain information of a node of a heterogeneous network, where the heterogeneous network refers to a network other than the AIS network. One manner is to send information of a heterogeneous (or virtual) node in an increment time division multiple access (ITDMA) manner by using the AIS. For example, an AIS virtual navigation mark or the like is adopted. In the manner of adopting an AIS virtual navigation mark for navigation, after an AIS module is installed on the navigation mark, the navigation mark may be displayed on a shipborne terminal. The virtual AIS navigation mark may be generated by a base station that supports this function. A navigation mark state is encoded in a particular format and then sent in a form of security information. Logic of parsing and display of the shipborne terminal is modified correspondingly, that is, the navigation mark state can be decoded dedicatedly and displayed on the terminal.

However, in this manner, the navigation state information sent by using ITDMA interferes with normal information sending of an AIS station, reduces a data processing speed, and may cause an overload of channel. In addition, a data sending frequency cannot be automatically decreased when the channel is overloaded, so that a station connected in this manner and a real station are incapable of negotiating channel allocation with each other.

SUMMARY

Embodiments of the present invention provide a data processing method and apparatus based on an automatic identification system, which can remain compatible with an existing automatic identification system on a basis of supporting access of multiple virtual stations, and can improve a data processing speed.

According to one aspect, an embodiment of the present invention provides a data processing method based on an automatic identification system, including:

receiving, by a virtual station container, data request sent by a poller, and successively checking whether each virtual station in the virtual station container has to-be-sent data in a current timeslot, where the virtual station includes a virtual timeslot allocation logic (TAL) device; and reading, when a first virtual station has to-be-sent data in the current timeslot, by the virtual station container, the data in the first virtual station, and sending the read data to a transmitter.

The receiving a data request sent by a poller includes:

when a new timeslot of a frame arrives, receiving the data request sent by the poller; or, when a data source determines, according to a report rate, that data needs to be sent in the current timeslot, receiving the data request sent by the poller.

In another embodiment, the virtual station further includes a navigation state cache (NSC) device corresponding to the virtual TAL device; and the reading, when a first virtual station has to-be-sent data in the current timeslot, by the virtual station container, the data in the first virtual station, and sending the read data to a transmitter includes:

when a first virtual TAL device in the first virtual station has to-be-sent data in the current timeslot, sending, by the virtual station container, an identifier of the first virtual TAL device to the poller;

receiving, by the virtual station container, an instruction of reading data in an NSC device corresponding to the first virtual TAL device, where the instruction is sent by the poller; and reading, by the virtual station container, the data in the NSC device according to the instruction, performing packet encoding on the data, and sending an encoded data packet to the transmitter.

In another embodiment, the method further includes:

receiving, by the virtual station container, a data update request sent by a data accessor, and checking whether a second virtual station corresponding to to-be-updated data included in the data update request exists; when the second virtual station corresponding to the to-be-updated data does not exist, creating, by the virtual station container, the second virtual station, and storing the to-be-updated data into an NSC device that is in the second virtual station and corresponding to a second virtual TAL device; and when the second virtual station corresponding to the to-be-updated data exists, updating, by the virtual station container according to the to-be-updated data, data in the NSC device that is in the second virtual station and corresponding to the second virtual TAL device. When each frame ends, a virtual station in which data is not updated in a preset period of time is checked, and the virtual station in which data is not updated is deleted.

The method further includes: detecting whether a current navigation state changes; and when the current navigation state changes, obtaining a new report rate, and sending the new report rate to a proxy, where a data prefetch policy is adjusted by the proxy.

In another embodiment, the receiving a data update request sent by a data accessor includes:

after a proxy receives a prefetch data message sent by a first timer and obtains prefetch data in a data source, receiving, by the virtual station container, the data update request sent by the data accessor, where the first timer determines, according to a report rate, time to send the prefetch data message; or, after a proxy receives the to-be-updated data pushed by a data source, receiving, by the virtual station container, the data update request sent by the data accessor, where the data source determines, according to a report rate, time to push the to-be-updated data.

In another embodiment, the current timeslot adopted when the virtual station container sends the read data in the first virtual station to the transmitter is determined according to a timeslot selection protocol with self-organized time division multiple access (SOTDMA) as a core, and the current timeslot is adopted when a next frame is sent; or, the current timeslot adopted when the virtual station container sends the read data in the first virtual station to the transmitter is determined according to a timeslot selection protocol with carrier sense time division multiple access (CSTDMA) as a core, and the current timeslot is adopted when a current frame is sent.

According to another aspect, an embodiment of the present invention further provides a data processing apparatus based on an automatic identification system, including:

a receiving unit, configured to receive a data request sent by a poller, and send the data request to a checking unit;

the checking unit, configured to receive the data request sent by the receiving unit, and successively check whether each virtual station in a virtual station container has to-be-sent data in a current timeslot, where the virtual station includes a virtual TAL device; and a reading and sending unit, configured to: when a first virtual station has to-be-sent data in the current timeslot, read the data in the first virtual station, and send the read data to a transmitter.

In another embodiment, the receiving unit is configured to:

when a new timeslot of a frame arrives, receive the data request sent by the poller; or, when a data source determines, according to a report rate, that data needs to be sent in the current timeslot, receive the data request sent by the poller.

In another embodiment, the virtual station further includes an NSC device corresponding to the virtual TAL device; and the reading and sending unit includes:

a sending module, configured to: when a first virtual TAL device in the first virtual station has to-be-sent data in the current timeslot, send an identifier of the first virtual TAL device to the poller;

a receiving module, configured to receive an instruction of reading data in an NSC device corresponding to the first virtual TAL device, where the instruction is sent by the poller; and a reading module, configured to read the data in the NSC device according to the instruction, and perform packet encoding on the data;

where the sending module is configured to send an encoded data packet to the transmitter.

In another embodiment, the receiving unit is further configured to receive a data update request sent by a data accessor; and the checking unit is further configured to check whether a second virtual station corresponding to to-be-updated data included in the data update request exists;

the apparatus further includes: a creating unit, configured to: when the second virtual station corresponding to the to-be-updated data does not exist, create the second virtual station; and an updating unit, configured to store the to-be-updated data into an NSC device that is in the second virtual station and corresponding to a second virtual TAL device;

where the updating unit is further configured to: when the second virtual station corresponding to the to-be-updated data exists, update, according to the to-be-updated data, data in the NSC device that is in the second virtual station and corresponding to the second virtual TAL device.

In another embodiment, the apparatus further includes:

a detecting unit, configured to detect whether a current navigation state changes; and an obtaining unit, configured to: when the current navigation state changes, obtain a new report rate, and send the new report rate to a proxy, where a data prefetch policy is adjusted by the proxy.

The receiving unit is configured to:

after a proxy receives a prefetch data message sent by a first timer and obtains prefetch data in a data source, receive the data update request sent by the data accessor, where the first timer determines, according to a report rate, time to send the prefetch data message; or, after a proxy receives the to-be-updated data pushed by a data source, receive the data update request sent by the data accessor, where the data source determines, according to a report rate, time to push the to-be-updated data.

In another embodiment, the current timeslot adopted when the virtual station container sends the read data in the first virtual station to the transmitter is determined according to a timeslot selection protocol with SOTDMA as a core, and the current timeslot is adopted when a next frame is sent; or, the current timeslot adopted when the virtual station container sends the read data in the first virtual station to the transmitter is determined according to a timeslot selection protocol with CSTDMA as a core, and the current timeslot is adopted when a current frame is sent.

The embodiments of the present invention provide a data processing method and apparatus based on an automatic identification system. A data request sent by a poller is received, and it is checked successively whether each virtual station in a virtual station container has to-be-sent data in a current timeslot; and when a first virtual station has to-be-sent data in the current timeslot, the data in the first virtual station is read and sent to a transmitter for transmission. In the embodiments of the present invention, a virtual station container is introduced to save navigation state information and communication state information of multiple communication entities (virtual stations), determine, in a polling manner, that a virtual station in the virtual station container has to-be-sent data, and send the to-be-sent data, so that communication with a heterogeneous network can be implemented, which avoids sending dynamic information (navigation state) in a form of security information (such as alarm information or help information) in the prior art, thereby avoiding interference with normal information sending of the station, and improving a data processing speed.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
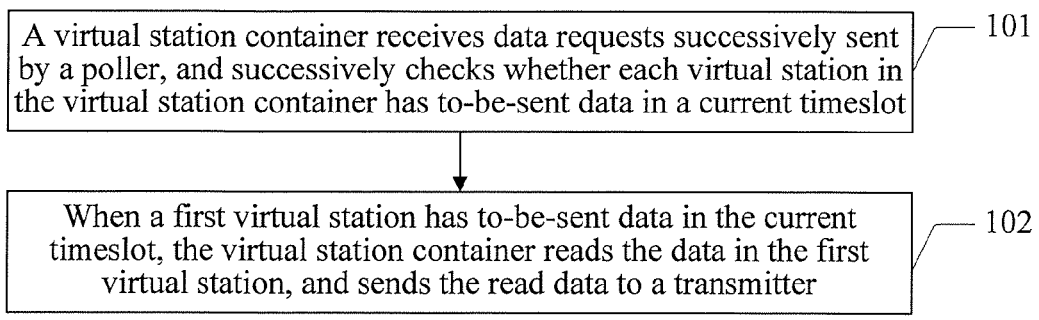
FIG. 1 is a flowchart of a data processing method based on an automatic identification system according to Embodiment 1 of the present invention.

The embodiment of the present invention provides a data processing method based on an automatic identification system. As shown in FIG. 1, the method includes:

Step 101: A virtual station container receives data requests successively sent by a poller, and successively checks whether each virtual station in the virtual station container has to-be-sent data in a current timeslot, where the virtual station includes a virtual timeslot allocation logic TAL device.

The virtual station container indicates one state pool. The virtual station container includes multiple virtual stations. The virtual stations save respective states in the state pool, and complete timeslot allocation in the state pool. That is, the virtual station indicates a state of one station, where the station may be a real station or may be a virtual station.

When a new timeslot of a frame arrives, a data request sent by the poller is received. When a new timeslot of each frame arrives, a second timer sends, to a transmitter, a signal indicating that the new timeslot arrives. In this case, the transmitter sends the data request to the poller and checks whether there is data to be sent in this timeslot. Then, the poller initiates a data request to the virtual station container, and the virtual station container checks whether each virtual timeslot allocation logic (TAL) device included in the virtual station container has data to be sent.

Alternatively, when a data source determines, according to a report rate, that data needs to be sent in the current timeslot, the data request sent by the poller is received. In this manner, the data source actively pushes the to-be-sent data according to the report rate, and a specific processing manner thereof is the same as the foregoing processing manner when a new timeslot arrives.

It should be noted that, a report rate (RR) refers to the number of reports per minute; a sending frequency of dynamic information is adjusted according to a ship state, and the report rate changes in direct proportion to a navigation speed. However, an AIS specifies that a maximum report rate should not exceed 30 per minute.

Step 102: When a first virtual station has to-be-sent data in the current timeslot, the virtual station container reads the data in the first virtual station, and sends the read data to a transmitter.

The virtual station includes a virtual timeslot allocation logic TAL device and a navigation state cache (NSC) device corresponding to the virtual TAL device, where information stored in the NSC device may include ship position information and the NSC device may be another device that can obtain information such as a ship speed and a ship direction.

When the first virtual TAL device in the first virtual station has to-be-sent data in the current timeslot, the virtual station container sends an identifier of the first virtual TAL device to the poller.

The virtual station container receives an instruction of reading data in an NSC device corresponding to the first virtual TAL device, where the instruction is sent by the poller.

The virtual station container reads the data in the NSC device according to the instruction, performs packet encoding on the data, and sends an encoded data packet to the transmitter; then the transmitter sends the data packet to a Media Access Control (MAC) layer.

Further, the virtual station container receives a data update request sent by a data accessor, and checks whether a second virtual station corresponding to to-be-updated data included in the data update request exists.

When the second virtual station corresponding to the to-be-updated data does not exist, the virtual station container creates the second virtual station, and stores the to-be-updated data into an NSC device that is in the second virtual station and corresponding to a second virtual TAL device.

When the second virtual station corresponding to the to-be-updated data exists, the virtual station container updates, according to the to-be-updated data, data in the NSC device that is in the second virtual station and corresponding to the second virtual TAL device.

The method further includes: detecting whether a current navigation state changes.

When the current navigation state changes, a new report rate is obtained, and the new report rate is sent to a proxy, and a data prefetch policy is adjusted by the proxy.

In this embodiment, the current timeslot adopted when the virtual station container sends the read data in the first virtual station to the transmitter is determined according to a timeslot selection protocol with self-organized time division multiple access (SOTDMA) as a core, and the current timeslot, that is, a reserved timeslot, is adopted when a next frame is sent; or, the current timeslot adopted when the virtual station container sends the read data in the first virtual station to the transmitter is determined according to a timeslot selection protocol with carrier sense time division multiple access (CSTDMA) as a core, and the current timeslot, that is, a timeslot used immediately after being selected, is adopted when a current frame is sent.

It should be noted that, in this embodiment, "first" and "second" in the first virtual TAL device and the second virtual TAL device are not used for sorting virtual TAL devices, but for ease of description, where the first virtual TAL device and the second virtual TAL device each may refer to any virtual TAL device in the virtual station container.

The embodiment of the present invention provides a data processing method based on an automatic identification system. A virtual station container is introduced to save navigation state information and communication state information of multiple communication entities (virtual stations), determine, in a polling manner, that a certain virtual station in the virtual station container has to-be-sent data, and send the to-be-sent data, so that communication with a heterogeneous network can be implemented, which avoids sending dynamic information (navigation state) in a form of security information (such as alarm information or help information) in the prior art, thereby avoiding interference with normal information sending of the station, and improving a data processing speed.

Figure 2:
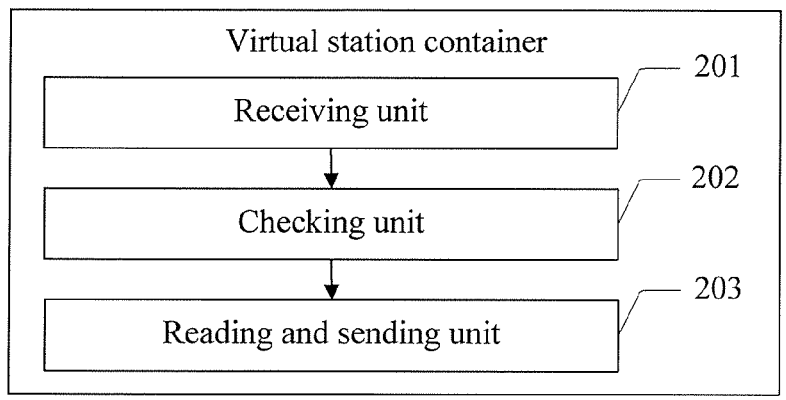
FIG. 2 is a block diagram of a data processing apparatus based on an automatic identification system according to Embodiment 1 of the present invention.

An embodiment of the present invention provides a data processing apparatus based on an automatic identification system. The apparatus may be a virtual station container. As shown in FIG. 2, the apparatus includes: a receiving unit 201, a checking unit 202, and a reading and sending unit 203.

The receiving unit 201 is configured to receive a data request sent by a poller, and send the data request to the checking unit 202.

The receiving unit 201 is configured to: when a new timeslot of a frame arrives, receive the data request sent by the poller; or, when a data source determines, according to a report rate, that data needs to be sent in a current timeslot, receive the data request sent by the poller.

The checking unit 202 is configured to receive the data request sent by the receiving unit 201, and successively check whether each virtual station in a virtual station container has to-be-sent data in the current timeslot, where the virtual station includes a virtual timeslot allocation logic TAL device.

The virtual station container indicates a state pool. The virtual station container includes multiple virtual stations. The virtual stations save respective states in the state pool and complete timeslot allocation in the state pool. That is, the virtual station indicates a state of a station, and the station may be a real station or may be a virtual station.

The reading and sending unit 203 is configured to: when a first virtual station has to-be-sent data in the current timeslot, read the data in the first virtual station, and send the read data to a transmitter.

The virtual station further includes an NSC device corresponding to the virtual TAL device.

A sending module in the reading and sending unit 203 is configured to: when a first virtual TAL device in the first virtual station has to-be-sent data in the current timeslot, send an identifier of the first virtual TAL device to the poller.

A receiving module in the reading and sending unit 203 is configured to receive an instruction of reading data in an NSC device corresponding to the first virtual TAL device, where the instruction is sent by the poller.

A reading module in the reading and sending unit 203 is configured to read the data in the NSC device according to the instruction, and perform packet encoding on the data.

The sending module is configured to send an encoded data packet to the transmitter.

Further, the receiving unit 201 is further configured to receive a data update request sent by a data accessor; and the checking unit 202 is further configured to check whether a second virtual station corresponding to to-be-updated data included in the data update request exists.

The apparatus further includes: a creating unit, configured to: when the second virtual station corresponding to the to-be-updated data does not exist, create the second virtual station;

an updating unit, configured to store the to-be-updated data into an NSC device that is in the second virtual station and corresponding to a second virtual TAL device;

where the updating unit is further configured to: when the second virtual station corresponding to the to-be-updated data exists, update, according to the to-be-updated data, data in the NSC device that is in the second virtual station and corresponding to the second virtual TAL device;

a detecting unit, configured to detect whether a current navigation state changes; and an obtaining unit, configured to: when the current navigation state changes, obtain a new report rate, and send the new report rate to a proxy, where a data prefetch policy is adjusted by the proxy.

In this embodiment, the current timeslot adopted when the virtual station container sends the read data in the first virtual station to the transmitter is determined according to a timeslot selection protocol with SOTDMA as a core, and the current timeslot, that is, a reserved timeslot, is adopted when a next frame is sent; or the current timeslot adopted when the virtual station container sends the read data in the first virtual station to the transmitter is determined according to a timeslot selection protocol with CSTDMA as a core, and the current timeslot, that is, a timeslot used immediately after being selected, is adopted when a current frame is sent.

It should be noted that, in this embodiment, "first" and "second" in the first virtual TAL device and the second virtual TAL device are not used for sorting virtual TAL devices, but for ease of description, where the first virtual TAL device and the second virtual TAL device each may refer to any virtual TAL device in the virtual station container.

The embodiment of the present invention provides a data processing apparatus based on an automatic identification system. A receiving unit is configured to receive a data request sent by a poller, and send the data request to a checking unit; the checking unit is configured to receive the data request sent by the receiving unit, and successively check whether each virtual station in a virtual station container has to-be-sent data in a current timeslot, where each virtual station includes a virtual TAL; and a reading and sending unit is configured to: when a first virtual station has to-be-sent data in the current timeslot, read the data in the first virtual station, and send the read data to a transmitter. In the embodiment of the present invention, a virtual station container is introduced to save navigation state information and communication state information of multiple communication entities (virtual stations), determine, in a polling manner, that a certain virtual station in the virtual station container has to-be-sent data, and send the to-be-sent data, so that communication with a heterogeneous network can be implemented, which avoids sending dynamic information (navigation state) in a form of security information (alarm information or help information) in the prior art, thereby avoiding interference with normal information sending of the station. Therefore, a high simulation degree of access is ensured, and a data processing speed is improved.

Embodiment 2

Figure 3:
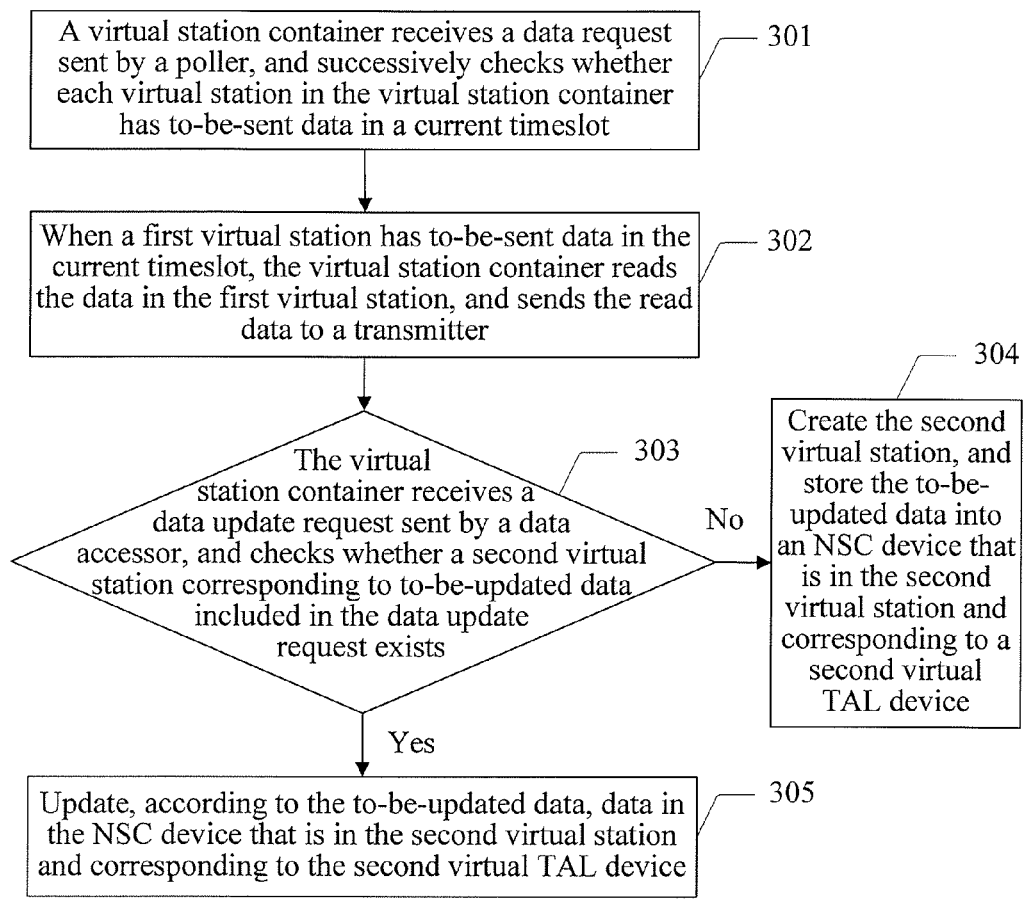
FIG. 3 is a flowchart of a data processing method based on an automatic identification system according to Embodiment 2 of the present invention.

The embodiment of the present invention provides a data processing method based on an automatic identification system. The method is executed by a virtual station container. As shown in FIG. 3, the method includes:

Step 301: A virtual station container receives a data request sent by a poller, and successively checks whether each virtual station in the virtual station container has to-be-sent data in a current timeslot, where the virtual station includes a virtual timeslot allocation logic TAL device.

Figure 4:
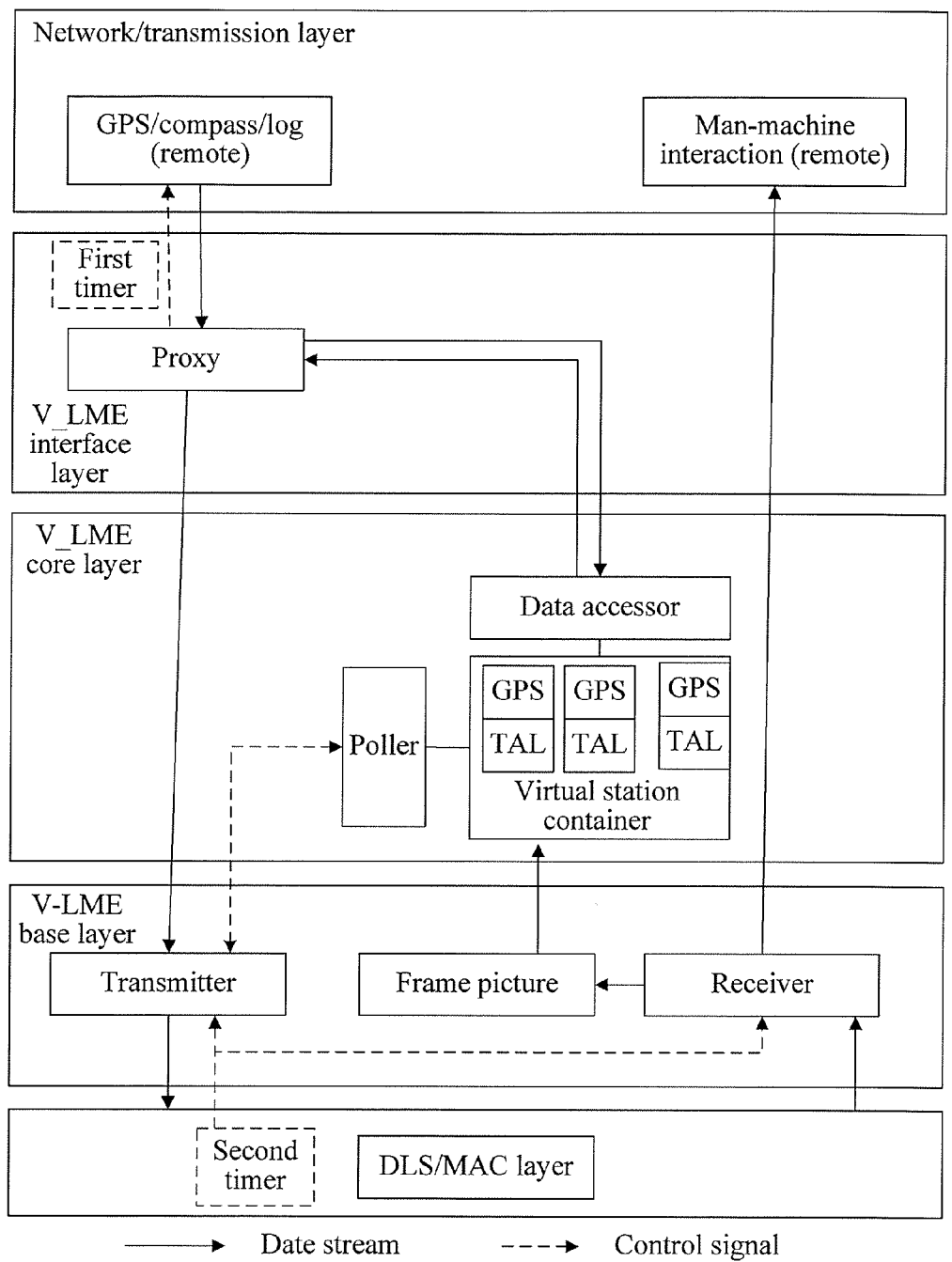
FIG. 4 is an overall schematic structural diagram of a station according to Embodiment 2 of the present invention.

The virtual station container indicates a state pool. The virtual station container includes multiple virtual stations. The virtual stations save respective states in the state pool, and complete timeslot allocation in the state pool. In an overall schematic structural diagram of a station as shown in FIG. 4, the virtual station further includes an NSC device corresponding to the virtual TAL device, where each virtual TAL device and an NSC device corresponding to the virtual TAL device indicate a virtual station state corresponding to a communication entity state, that is, a virtual station indicates a state of a station, and the station may be a real station or may be a virtual station. Another real station may receive information from these virtual stations by using a Very High Frequency (VHF) device of a station where the virtual station container is located, and considers that received data packets are all sent or forwarded by nearby real stations, so that the virtual stations in the virtual station container are analyzed and displayed in a same way as a real station. VHF refers to radio waves with frequency band from 30 MHz to 300 MHz, and most VHF devices are used for radio station and television station broadcasting, and can also be used for communication in aviation and navigation.

Specifically, a communication entity state may be divided into two parts: a communication state and a data state. The communication state refers to a current operational state of TAL, including a mode (autonomous or assigned), a protocol (ITDMA, SOTDMA, or the like), a protocol parameter, a current timeslot number, or the like, where in an autonomous mode, a ship station may send data according to its own report rate; and in an assigned mode, a ship station may send data according to a report rate specified by a base station. The ship station and the base station are collectively referred to as a station. These states are not all explicit, that is, these states cannot be expressed in a formalized manner, but implicitly reflected in a current program state. Therefore, the timeslot allocation logic may be placed in a container as a whole in a form of external encapsulation, and different virtual stations correspond to different running implementations. In addition, each virtual station further saves its own current data state. The data in this embodiment includes information data such as a ship position, a ship speed, and a navigation direction.

The virtual TAL device reserves a timeslot according to a current frame picture. The frame picture may also be referred to as a frame table, and is used for recording a data structure of a timeslot allocation state of a region where a current physical station is located, and the change of the frame picture is updated by a receiver periodically. After receiving a data packet, the receiver updates the frame picture according to the reserved timeslot in the data packet, and the virtual TAL device calculates its own timeslot reservation according to the frame picture, that is, in which timeslot, there is data to be sent. It should be noted that, the frame picture belongs to global data, and may be shared among virtual stations.

Further, in this embodiment, two manners may be adopted to obtain data. One manner is a pull PULL manner: a (remote) data source passively waits for a data obtaining request. In this case, the proxy periodically requests navigation state data from the data source according to a report rate and refreshes the navigation state data to a corresponding virtual station container. When a new timeslot arrives and is used by a corresponding station, the data is read and subject to VHF sending. The other manner is a push PUSH manner: a data source actively pushes data to the proxy periodically. A sending frequency is no longer decided by the proxy, but is decided by the data source itself according to a report rate. Specifically, the proxy refreshes the data to the NSC device in the virtual station container, and a subsequent data processing process is the same as the PULL manner.

It should be noted that, four protocols may be adopted to select a timeslot for sending information, which are SOTDMA, ITDMA, random access time division multiple access (RATDMA), and fixed access time division multiple access (FATDMA). The FATDMA is used by a base station to send repetitive messages.

When the other three protocols are used to select a timeslot, the following manners are adopted: after start-up, the RATDMA uses a p-continuous algorithm to first fetch one timeslot from a channel in a contention manner, and then delivers the timeslot to the ITDMA protocol. The ITDMA uses the timeslot to send a packet in one frame while reserving several timeslots forward, and sets, in the packet, that these timeslots keep occupying in a next frame. The foregoing is referred to as a first frame phase. After the first frame is complete, the process proceeds to the SOTDMA protocol. The SOTDMA uses the timeslot which is applied for by the ITDMA to send dynamic information, and continues to state, in the packet, that the timeslot continues to occupy next several frames. In this case, after the ITDMA reserves a new timeslot, a time-out value may be generated randomly, where the time-out value ranges from 3 to 7. In this way, the SOTDMA maintains a timeslot set, and each time a timeslot therein is used, the time-out value corresponding to the timeslot is decreased by 1. When the time-out value of a timeslot is 0, it means that the timeslot cannot be used in a next frame, and the SOTDMA reselects a timeslot in a range where a report rate requirement of the the SOTDMA can be satisfied, and updates the time-out value of the timeslot. The foregoing processes are performed cyclically and repeatedly, an autonomous and continuous sending process of the AIS is implemented.

In addition, a period for the AIS to allocate timeslots is one frame, that is, 1 minute. One frame may be divided into 2250 timeslots, and each timeslot is 26.67 ms. The timeslot is used as a minimum unit of channel allocation.

It should be noted that, a RR refers to the number of reports per minute, a sending frequency of dynamic information is adjusted according to a ship state, and the report rate changes in direct proportion to a navigation speed. However, an AIS specifies that a maximum report rate should not exceed 30 per minute.

Step 302: When a first virtual station has to-be-sent data in the current timeslot, the virtual station container reads the data in the first virtual station, and sends the read data to a transmitter.

Further, when the first virtual TAL device in the first virtual station has to-be-sent data in the current timeslot, an identifier of the first virtual TAL device is sent to the poller, which indicates that the first virtual TAL device has data to be sent. It should be noted that, the "first" in the first virtual TAL device is not used for sorting herein, but is used only for ease of description. The first virtual TAL device may refer to any virtual TAL device included in the virtual station container.

The virtual station container receives an instruction of reading data in an NSC device corresponding to the first virtual TAL device, where the instruction is sent by the poller.

The virtual station container reads the data in the NSC device according to the instruction, performs packet encoding on the data, and sends an encoded data packet to the transmitter; then the transmitter sends the encoded data packet to a bottom layer.

In a schematic diagram as shown in FIG. 4, in the embodiment of the present invention, a Link Management Entity (LME) layer is reconstructed as three layers: a Virtualized-LME (V-LME) base layer, a V-LME core layer and a V-LME interface layer. A virtual station container is located at the V-LME core layer, and in addition, the core layer further includes: a poller and a data accessor. The virtual station container includes multiplea plurality of virtual stations, so the poller needs to check one by one in a polling manner. The V-LME base layer includes a transmitter, a receiver, and a module maintaining a frame picture, and this part is the same as a part in the prior art. In the prior art, because there is only one TAL, the frame picture is only used by this ship, where the frame picture provides a determining base for the TAL; however, the frame picture in this embodiment is a global data frame picture and can be shared among stations.

Specifically, when a new timeslot arrives, or a data source has data to be pushed, a second timer sends a signal indicating that the new timeslot arrives to the transmitter, and then the transmitter sends a data request message to the poller. Next, the poller initiates polling to the virtual station container; and the virtual station container successively checks, according to the data request sent by the poller, whether the timeslot of each virtual TAL device is reserved, that is, whether there is data to be sent in this timeslot. When there is data to be sent, the virtual station container sends an identifier of a virtual TAL device that needs to send data to the poller. When an instruction that is of reading data and sent by the poller is received, corresponding data is read; after packet encoding is performed on the data, the data is sent by the poller to the transmitter, and is further sent to an MAC layer for further processing.

It should be noted that, when there are two pieces of data to be sent in one timeslot, that is, when a conflict occurs, one piece of the data may be selected and sent, or neither of the two pieces of data is sent.

Step 303: The virtual station container receives a data update request sent by a data accessor, and checks whether a second virtual station corresponding to to-be-updated data included in the data update request exists.

As shown in FIG. 4, a data source in this embodiment is placed at a network remote end. Therefore, when data is accessed, data needs to be obtained through a network. This process may be a minute level or even a second level, which is different from the prior art in which a data source is placed on a board of an automatic identification system station and data can be read in time when a new timeslot arrives. Therefore, data needs to be prefetched or a data obtaining frequency needs to be increased, thereby controlling a delay within a reasonable range.

Further, in this embodiment, when data is updated in a PULL manner, after the proxy receives a prefetch data message sent by a first timer and obtains the data in the data source, the proxy receives the data update request sent by the data accessor, where it should be noted that, the first timer is a device that logically exists and may have no physical entity. The first timer determines, according to a report rate, time to send the prefetch data message. That is, data is updated by using the data accessor, and a data pref etching frequency is adjusted according to a returned new report rate.

Specifically, the first timer is located in a proxy at the V-LME interface layer. When the first timer calculates, according to the report rate in the proxy, data to be prefetched, the proxy sends a data obtaining request to the data source located at the network remote end, and receives data returned by the data source. Then the proxy sends the data update request to the data accessor. After receiving the data update request, the data accessor forwards the request to the virtual station container; then the virtual station container receives the data update request sent by the data accessor, and checks whether a second virtual station corresponding to the to-be-updated data included in the data update request exists. Specifically, the virtual station container checks whether a second virtual TAL device in the second virtual station corresponding to the to-be-updated data included in the data update request exists.

Alternatively, in this embodiment, when data is updated in a PUSH manner, after receiving the to-be-updated data pushed by the data source, the proxy receives the data update request sent by the data accessor, where the data source determines, according to a report rate, time to push the to-be-updated data. The report rate changes frame by frame with a navigation state reflected by data.

Specifically, when the data is updated in a PUSH manner, design of the V-LME interface layer may be simplified, that is, the first timer may not be set at the V-LME interface layer; the first timer may be placed at a data source side, and no data prefetch policy needs to be set at the V-LME interface layer. In addition, same report rate calculation logic is separately located in the data source and the virtual TAL device, and update of the report rates in the data source and the virtual TAL device may be triggered in a same manner. In this case, the data source calculates, according to a report rate, time when data needs to be updated, and then sends the to-be-updated data to the proxy. After receiving the to-be-updated data, the proxy sends the data update request to the data accessor; the data accessor forwards the request to the virtual station container according to the received data update request; further, the virtual station container receives the data update request sent by the data accessor, and checks whether a second virtual TAL device corresponding to the to-be-updated data included in the data update request exists.

Step 304: When the second virtual station corresponding to the to-be-updated data does not exist, the virtual station container creates the second virtual station, and stores the to-be-updated data into an NSC device that is in the second virtual station and corresponding to the second virtual TAL device.

When the second virtual TAL device corresponding to the to-be-updated data does not exist, it indicates that the to-be-updated data is data of a new virtual station, and a virtual station corresponding to the data, that is, a virtual TAL device and an NSC device, needs to be established. In addition, when each frame ends, the virtual station container checks a virtual station in which data is not updated in a preset period of time, and deletes the virtual station in which data is not updated. The preset period of time may be set according to experience.

Step 305: When the second virtual station corresponding to the to-be-updated data exists, the virtual station container updates, according to the to-be-updated data, data in the NSC device that is in the second virtual station and corresponding to the second virtual TAL device.

It should be noted that, after data is updated in a PULL manner, the following operations further need to be executed to update the report rate: detecting, by the virtual TAL device, whether a current navigation state changes; and when the current navigation state changes, obtaining a new report rate, and sending the new report rate to the proxy, and adjusting, by the proxy, a data prefetch policy. The report rate is adjusted with change of a navigational speed, a turning rate and the like (which is explicitly specified in the AIS standard). Therefore, a current navigational speed may be obtained by using the NSC device, the new report rate is sent by the data accessor to the proxy, and the data prefetch policy is adjusted by the proxy, so that data is prefetched.

It should be noted that, in this embodiment, during data processing, a timeslot for sending data may be determined by using a timeslot selection protocol with the SOTDMA as a core, and to-be-sent data is obtained according to a reserved timeslot. In this embodiment, a timeslot may also be determined by using the CSTDMA.

Figure 5:
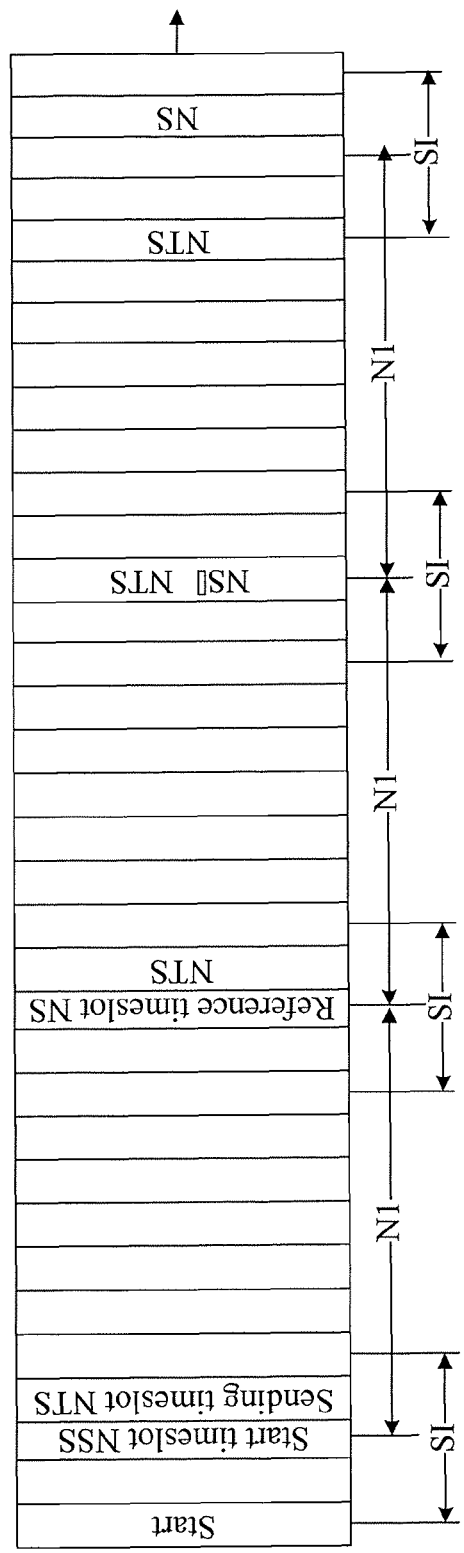
FIG. 5 is a schematic diagram of timeslot selection by using CSTDMA according to Embodiment 2 of the present invention.

Timeslot selection manners of the CSTDMA and the SOTDMA are similar. Specifically, as shown in FIG. 5, in each frame, the CSTDMA first determines a start timeslot, which is referred to as an NSS. Then the NSS is moved forward step by step at an interval NI to obtain a reference timeslot, which is referred to as an NS. When a timeslot needs to be selected, the CSTDMA uses the NS as a center and randomly selects an idle timeslot between [NS−SI/2, NS+SI/2] as a determined sending timeslot, for example, an NTS in FIG. 5, where SI is a length specified in a CSTDMA protocol.

The difference between the CSTDMA and the SOTDMA lies in that: the current timeslot adopted when the virtual station container sends the read data in the first virtual station to a transmitter, that is, a timeslot adopted when data is sent is determined according to a timeslot selection protocol with the SOTDMA as a core, and the current timeslot, that is, a reserved timeslot, is adopted when a next frame is sent; or, the current timeslot adopted when the virtual station container sends the read data in the first virtual station to a transmitter, that is, a timeslot adopted when data is sent is determined according to a timeslot selection protocol with the CSTDMA as a core, and the current timeslot, that is, a timeslot used immediately after being selected, is adopted when a current frame is sent.

At a V-LME core layer in an overall structure of a station, nodes in the virtual station container send packets in a tentative manner. If no conflict is detected, the sending succeeds, and if a conflict is detected, another candidate timeslot is randomly selected for resending until the sending succeeds. When the sending does not succeed at preset sending times, the sending is directly given up. However, a manner of processing data in a timeslot determined by using the CSTDMA is the same as a data processing manner provided in this embodiment, which is not described repeatedly herein.

The embodiment of the present invention provides a data processing method based on an automatic identification system. A virtual station container is introduced to save navigation state information and communication state information of multiple communication entities (virtual stations), determine, in a polling manner, that a certain virtual station in the virtual station container has to-be-sent data, and send the to-be-sent data, so that supporting access of multiple stations can be implemented, and during data processing, interference with normal information sending of a station is avoided, thereby improving a data processing speed. In addition, even if an AIS device where the virtual station container is located is damaged, a ship may still map its own navigation state to a nearby AIS station in a communication manner such as WIFI or satellite, thereby providing system reliability.

Figure 6:
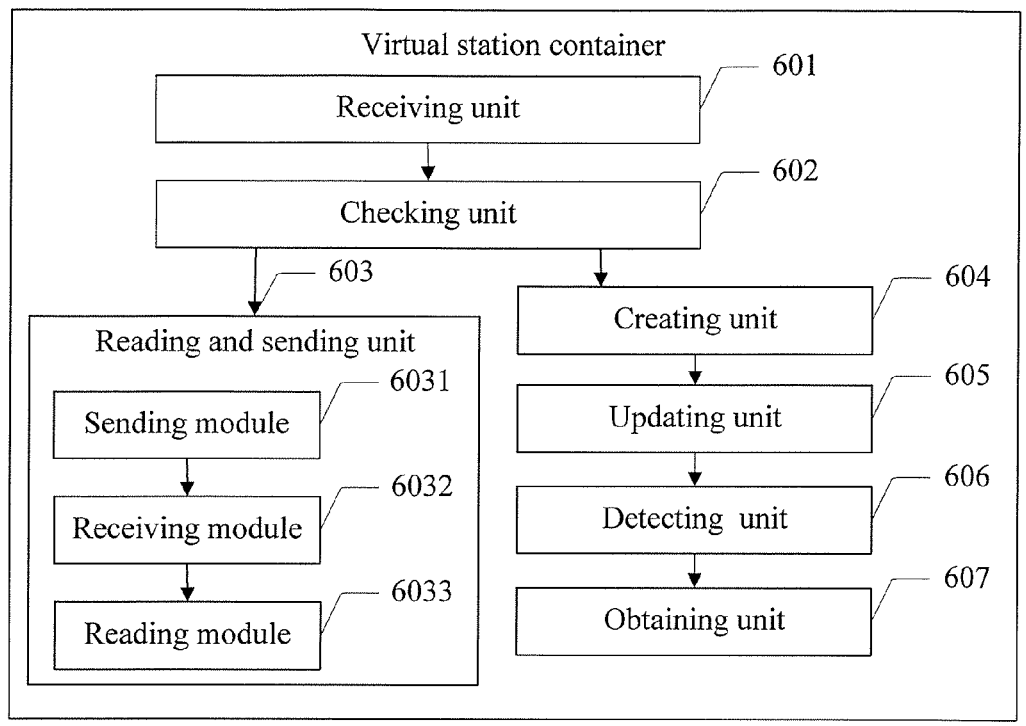
FIG. 6 is a block diagram of a data processing apparatus based on an automatic identification system according to Embodiment 2 of the present invention.

An embodiment of the present invention provides a data processing apparatus based on an automatic identification system. The apparatus may be a virtual station container. As shown in FIG. 6, the apparatus includes: a receiving unit 601, a checking unit 602, a reading and sending unit 603, a sending module 6031, a receiving module 6032, a reading module 6033, a creating unit 604, an updating unit 605, a detecting unit 606, and an obtaining unit 607.

The receiving unit 601 is configured to receive a data request sent by a poller, and send the data request to the checking unit 602.

Further, the receiving unit 601 is configured to: when a new timeslot of a frame arrives, receive the data request sent by the poller; or, when a data source determines, according to a report rate, that data needs to be sent in a current timeslot, receive the data request sent by the poller.

The checking unit 602 is configured to receive the data request sent by the receiving unit 601, and successively check whether each virtual station has to-be-sent data in the current timeslot, where the virtual station includes a virtual timeslot allocation logic TAL device.

The virtual station container indicates a state pool. The virtual station container includes multiple virtual stations. The virtual stations save their states in the state pool, and complete timeslot allocation in the state pool. The virtual station further includes an NSC device corresponding to the virtual TAL device, where each virtual TAL device and an NSC device corresponding to the virtual TAL device indicate a virtual station state corresponding to a communication entity state, that is, a virtual station indicates one state of a station, and the station may be a real station or may be a virtual station. Another real station may receive information of these virtual stations by using a VHF device of a station where the virtual station container is located, and considers that received data packets are all sent by nearby real stations, so that the virtual stations in the virtual station container are analyzed and displayed in a same way as a real station.

The reading and sending unit 603 is configured to: when a first virtual station has to-be-sent data in the current timeslot, read the data in the first virtual station, and send the read data to a transmitter.

Further, the sending module 6031 in the reading and sending unit 603 is configured to: when a first virtual TAL device in the first virtual station has to-be-sent data in the current timeslot, send an identifier of the first virtual TAL device to the poller.

The receiving module 6032 in the reading and sending unit 603 is configured to receive an instruction of reading data in an NSC device corresponding to the first virtual TAL device, where the instruction is sent by the poller.

The reading module 6033 in the reading and sending unit 603 is configured to read the data in the NSC device according to the instruction, and perform packet encoding on the data.

The sending module 6031 is configured to send an encoded data packet to the transmitter.

Further, the receiving unit 601 is further configured to receive a data update request sent by a data accessor.

The checking unit 602 is further configured to check whether a second virtual station corresponding to to-be-updated data included in the data update request exists.

When the second virtual station corresponding to the to-be-updated data does not exist, the creating unit 604 is configured to create the second virtual station; and the updating unit 605 is configured to store the to-be-updated data into an NSC device that is in the second virtual station and corresponding to a second virtual TAL device.

The updating unit 605 is further configured to: when the second virtual station corresponding to the to-be-updated data exists, update, according to the to-be-updated data, data in the NSC device that is in the second virtual station and corresponding to the second virtual TAL device.

The apparatus further includes: a deleting unit 606, configured to check, when each frame ends, a virtual station in which data is not updated in a preset period of time, and delete the virtual station in which data is not updated.

Further, the receiving unit 601 is configured to: after the proxy receives a prefetch data message sent by a first timer and obtains prefetch data in a data source, receive the data update request sent by the data accessor, where the first timer determines, according to a report rate, time to send the prefetch data message; or, after the proxy receives the to-be-updated data pushed by the data source, receive the data update request sent by the data accessor, where the data source determines, according to a report rate, time to push the to-be-updated data.

After the proxy receives the prefetch data message sent by the first timer and obtains the prefetch data in the data source, and after the data update request sent by the data accessor is received and the data is updated, the apparatus further includes: a detecting unit 607, configured to detect whether a current navigation state changes; and an obtaining unit 608, configured to: when the current navigation state changes, obtain a new report rate, and send the new report rate to the proxy, where a data prefetch policy is adjusted by the proxy.

The apparatus for performing data processing may adopt a timeslot selection protocol with the SOTDMA as a core to determine a timeslot for sending data, or may also adopt the CSTDMA protocol to determine a timeslot. Further, when to-be-sent data exists, one timeslot is randomly selected in a range of a preset timeslot according to the report rate, the to-be-sent data undergoes packet encoding and is sent to the transmitter, where in the preset timeslot, a timeslot selection protocol with the CSTDMA as a core is used to determine the timeslot for sending data.

It should be noted that, in this embodiment, the current timeslot adopted when the virtual station container sends the read data in the first virtual station to the transmitter is determined according to a timeslot selection protocol with SOTDMA as a core, and the current timeslot, that is, a reserved timeslot, is adopted when a next frame is sent; or, the current timeslot adopted when the virtual station container sends the read data in the first virtual station to the transmitter is determined according to a timeslot selection protocol with the CSTDMA as a core, and the current timeslot, that is, a timeslot used immediately after being selected, is adopted when a current frame is sent.

The embodiment of the present invention provides a data processing apparatus based on an automatic identification system. Data of each virtual station included in a virtual station container is processed, so that supporting access of multiple stations can be implemented, and during data processing, interference with normal information sending of a station is avoided, thereby improving a data processing speed.

Embodiment 3

Figure 7:
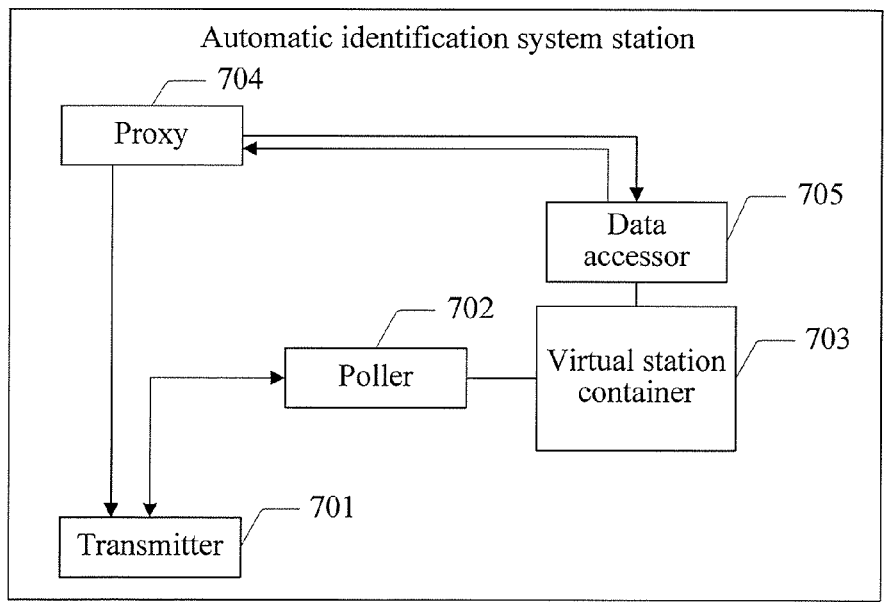
FIG. 7 is a block diagram of an automatic identification system station according to Embodiment 3 of the present invention.

The embodiment of the present invention provides an automatic identification system station. As shown in FIG. 7, the automatic identification system station includes: a transmitter 701, a poller 702, a virtual station container 703, a proxy 704, and a data accessor 705.

The transmitter 701 is configured to send a data request to the poller 702, where the data request is used to check whether to-be-sent data exists in a current timeslot.

The poller 702 is configured to receive the data request sent by the transmitter, and successively send data requests to the virtual station container 703.

The virtual station container 703 is configured to receive the data request sent by the poller 702, and successively check whether each virtual station has to-be-sent data in the current timeslot, where the virtual station includes a virtual timeslot allocation logic TAL device. When a first virtual station has to-be-sent data in the current timeslot, the virtual station container 703 reads the data in the first virtual station, and sends the read data to the transmitter.

The proxy 704 is configured to send a data update request to the data accessor 705.

The data accessor 705 is configured to receive the data update request, and forward the data update request to the virtual station container 703.

The virtual station container 703 is further configured to receive the data update request sent by the data accessor 705, and check whether a second virtual station corresponding to to-be-updated data included in the data update request exists; and when the second virtual station corresponding to the to-be-updated data does not exist, create the second virtual station, and store the to-be-updated data into an NSC device that is in the second virtual station and corresponding to the second virtual station; and when the second virtual station corresponding to the to-be-updated data exists, update, according to the to-be-updated data, data in the NSC device that is in the second virtual station and corresponding to the second virtual TAL device.

Further, when a new timeslot of a frame arrives, the virtual station container 703 receives the data request sent by the poller 702; or, when a data source determines, according to a report rate, that data needs to be sent in the current timeslot, the virtual station container 703 receives the data request sent by the poller 702.

Further, the virtual station includes a virtual timeslot allocation logic TAL device and an NSC device corresponding to the virtual TAL device; and the reading, when a first virtual TAL device has to-be-sent data in the current timeslot, by the virtual station container 703, data corresponding to the first virtual TAL device, and sending the data to the transmitter 701 includes:

when the first virtual TAL device in the first virtual station has to-be-sent data in the current timeslot, sending, by the virtual station container 703, an identifier of the first virtual TAL device to the poller 702;

receiving, by the virtual station container 703, an instruction of reading data in an NSC device corresponding to the first virtual TAL device, where the instruction is sent by the poller 702; and reading, by the virtual station container 703, the data in the NSC device according to the instruction, performing packet encoding on the data, and sending an encoded data packet to the transmitter 701.

Further, after the proxy 704 receives a prefetch data message sent by a first timer and obtains prefetch data in a data source, the virtual station container 703 receives the data update request sent by the data accessor 705, where the first timer determines, according to a report rate, time to send the prefetch data message; or, after the proxy 704 receives the to-be-updated data pushed by the data source, the virtual station container 703 receives the data update request sent by the data accessor 705, where the data source determines, according to a report rate, time to push the to-be-updated data.

Further, when each frame ends, the virtual station container checks a virtual station in which data is not updated in a preset period of time, and deletes the virtual station in which data is not updated.

In this embodiment, during data processing, the apparatus may adopt a timeslot selection protocol with SOTDMA as a core to determine a timeslot for sending data, or may adopt CSTDMA to determine a timeslot. When to-be-sent data exists, a timeslot is randomly selected in a range of a preset timeslot according to a report rate, the to-be-sent data undergoes packet encoding and is sent to a transmitter, where in the preset timeslot, a timeslot selection protocol with the CSTDMA as a core is used to determine the timeslot for sending data. It should be noted that, in this embodiment, the current timeslot adopted when the virtual station container sends the read data in the first virtual station to the transmitter is determined according to a timeslot selection protocol with SOTDMA as a core, and the current timeslot, that is, a reserved timeslot, is adopted when a next frame is sent; or, the current timeslot adopted when the virtual station container sends the read data in the first virtual station to the transmitter is determined according to a timeslot selection protocol with the CSTDMA as a core, and the current timeslot, that is, a timeslot used immediately after being selected, is adopted when a current frame is sent.

In this embodiment, the virtual station container includes a state of each virtual station, that is, the virtual station includes a virtual timeslot allocation logic TAL device and an NSC device corresponding to the virtual TAL device, where each virtual TAL device and the NSC device corresponding to the virtual TAL device indicate a virtual station state corresponding to a communication entity state, that is, the virtual station indicates one state of a station, where the station may be a real station, or may be a virtual station. Another real station may receive information of these virtual stations by using a VHF device of a station where the virtual station container is located, and considers that received data packets are all sent by nearby real stations, so that the virtual stations in the virtual station container are analyzed and displayed in a same way as a real station.

It should be noted that, when a station or a mobile terminal accesses a particular base station running V_LME, first, position matching may be performed in a cloud server, so as to send data in the station or the mobile terminal to a nearest base station running the V_ LME. In this way, static information of the station or the mobile terminal, such as a ship length, a ship number and a draft, may be saved in the cloud server. When the cloud server is connected to a service system in the station or the mobile terminal, the cloud server directly generates a static packet according to the saved static information and sends the static packet to the base station that runs the V_LME and is nearest to the station or the mobile terminal. A virtual station node is generated in the virtual station container in the base station, so as to transfer information.

It should be noted that, the virtual station container may be a data processing apparatus shown in FIG. 6 and based on an automatic identification system.

The embodiment of the present invention provides an automatic identification system station. A virtual station container is introduced to save navigation state information and communication state information of multiple communication entities (virtual stations), determine, in a polling manner, that a certain virtual station in the virtual station container has to-be-sent data, and send the to-be-sent data, so that supporting access of multiple stations can be implemented, and during data processing, interference with normal information sending of a station is avoided, thereby improving a data processing speed.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method based on an automatic identification system, the method comprising:

receiving, by a virtual station container, a data request sent by a poller, wherein the virtual station container contains at least two virtual stations, and successively checking whether or not each virtual station in the virtual station container has to-be-sent data in a current timeslot, wherein any virtual station of the at least two virtual stations comprises a virtual timeslot allocation logic (TAL) device;

reading, when a first virtual station has to-be-sent data in the current timeslot, by the virtual station container, the to-be-sent data in the first virtual station, and sending the read data to a transmitter;

wherein the virtual station further comprises a navigation state cache (NSC) device corresponding to the virtual TAL device;

wherein reading, when the first virtual station has to-be-sent data in the current timeslot, by the virtual station container, the to-be-sent data in the first virtual station, and sending the read data to the transmitter comprises:

when a first virtual TAL device in the first virtual station has to-be-sent data in the current timeslot, sending, by the virtual station container, an identifier of the first virtual TAL device to the poller, receiving, by the virtual station container, an instruction of reading data in a NSC device corresponding to the first virtual TAL device, wherein the instruction is sent by the poller, and reading, by the virtual station container, the data in the NSC device according to the instruction, performing packet encoding on the data in the NSC device, and sending an encoded data packet to the transmitter.

2. The method according to claim 1, wherein receiving, by the virtual station container, the data request sent by the poller comprises:
when a new timeslot of a frame arrives, receiving, by the virtual station container, the data request sent by the poller; or
when a data source determines, according to a report rate, that data needs to be sent in the current timeslot, receiving, by the virtual station container, the data request sent by the poller.

3. The method according to claim 1, wherein:
the current timeslot adopted when the virtual station container sends the read data in the first virtual station to the transmitter is determined according to a timeslot selection protocol with self-organized time division multiple access (SOTDMA) as a core, and the current timeslot is adopted when a next frame is sent; or
the current timeslot adopted when the virtual station container sends the read data in the first virtual station to the transmitter is determined according to a timeslot selection protocol with carrier sense time division multiple access (CSTDMA) as a core, and the current timeslot is adopted when a current frame is sent.

4. A data processing method based on an automatic identification system, the method comprising:
receiving, by a virtual station container, a data request sent by a poller, wherein the virtual station container contains at least two virtual stations, and successively checking whether or not each virtual station in the virtual station container has to-be-sent data in a current timeslot, wherein any virtual station of the at least two virtual stations comprises a virtual timeslot allocation logic (TAL) device;
reading, when a first virtual station has to-be-sent data in the current timeslot, by the virtual station container, the to-be-sent data in the first virtual station, and sending the read data to a transmitter;
receiving, by the virtual station container, a data update request sent by a data accessor, and checking whether or not a second virtual station corresponding to to-be-updated data comprised in the data update request exists;
when the second virtual station corresponding to the to-be-updated data does not exist, creating, by the virtual station container, the second virtual station, and storing the to-be-updated data into a navigation state cache (NSC) device that is in the second virtual station and corresponding to a second virtual TAL device; and
when the second virtual station corresponding to the to-be-updated data exists, updating, by the virtual station container according to the to-be-updated data, data in a NSC device that is in the second virtual station and corresponding to a second virtual TAL device.

5. The method according to claim 4, wherein the virtual station container checks, when each frame ends, a virtual station in which data is not updated in a preset period of time, and deletes the virtual station in which data is not updated.

6. The method according to claim 4, wherein after storing the to-be-updated data into the NSC device corresponding to the second virtual TAL device, or after updating, according to the to-be-updated data, the data in the NSC device corresponding to the second virtual TAL device, the method further comprises:
detecting whether or not a current navigation state changes; and
when the current navigation state changes, obtaining a new report rate, and sending the new report rate to a proxy, and adjusting, by the proxy, a data prefetch policy.

7. The method according to claim 4, wherein receiving, by the virtual station container, the data update request sent by the data accessor comprises:
after a proxy receives a prefetch data message sent by a first timer and obtains prefetch data in a data source, receiving, by the virtual station container, the data update request sent by the data accessor, wherein the first timer determines, according to a report rate, time to send the prefetch data message; or
after a proxy receives the to-be-updated data pushed by a data source, receiving, by the virtual station container, the data update request sent by the data accessor, wherein the data source determines, according to a report rate, time to push the to-be-updated data.

8. The method according to claim 4, wherein receiving, by the virtual station container, the data request sent by the poller comprises:
when a new timeslot of a frame arrives, receiving, by the virtual station container, the data request sent by the poller; or
when a data source determines, according to a report rate, that data needs to be sent in the current timeslot, receiving, by the virtual station container, the data request sent by the poller.

9. The method according to claim 4, wherein:
the current timeslot adopted when the virtual station container sends the read data in the first virtual station to the transmitter is determined according to a timeslot selection protocol with self-organized time division multiple access (SOTDMA) as a core, and the current timeslot is adopted when a next frame is sent; or
the current timeslot adopted when the virtual station container sends the read data in the first virtual station to the transmitter is determined according to a timeslot selection protocol with carrier sense time division multiple access (CSTDMA) as a core, and the current timeslot is adopted when a current frame is sent.

* * * * *